(12) United States Patent
Liu et al.

(10) Patent No.: US 6,895,129 B2
(45) Date of Patent: May 17, 2005

(54) OPTICAL CIRCULATOR

(75) Inventors: Zhimin Liu, San Jose, CA (US); Mark S. Wang, San Jose, CA (US); Shifang Li, Pleasanton, CA (US); Wenhui Wang, Santa Clara, CA (US); Yanbin Shao, San Jose, CA (US)

(73) Assignee: Oplink Communications, Inc., San Jose, CA (US)

( * ) Notice: Subject to any disclaimer, the term of this patent is extended or adjusted under 35 U.S.C. 154(b) by 204 days.

(21) Appl. No.: 10/135,862

(22) Filed: Apr. 29, 2002

(65) Prior Publication Data

US 2003/0202729 A1 Oct. 30, 2003

(51) Int. Cl.$^7$ .............................. G02B 6/27; G02B 5/30
(52) U.S. Cl. ........................... 385/11; 385/42; 359/495; 359/496; 359/497
(58) Field of Search .............................. 385/11, 31, 39, 385/42; 359/494–497

(56) References Cited

U.S. PATENT DOCUMENTS

| | | | | |
|---|---|---|---|---|
| 5,930,039 A | * | 7/1999 | Li et al. | 359/484 |
| 5,973,832 A | * | 10/1999 | Bettman | 359/484 |
| 5,991,076 A | * | 11/1999 | Cheng | 359/495 |
| 6,002,512 A | * | 12/1999 | Bergmann et al. | 359/281 |
| 6,052,228 A | | 4/2000 | Xie et al. | 359/496 |
| 6,175,448 B1 | * | 1/2001 | Xie et al. | 359/497 |
| 6,226,115 B1 | | 5/2001 | Shirasaki et al. | 359/280 |
| 6,246,807 B1 | * | 6/2001 | Lu et al. | 385/11 |
| 6,331,912 B1 | * | 12/2001 | Au-Yeung et al. | 359/484 |
| 6,366,402 B1 | * | 4/2002 | Li | 359/484 |
| 6,407,861 B1 | * | 6/2002 | Zhang et al. | 359/484 |
| 6,445,499 B1 | * | 9/2002 | Chang et al. | 359/484 |
| 6,587,267 B2 | * | 7/2003 | Tai et al. | 359/484 |
| 6,590,706 B1 | * | 7/2003 | Xie et al. | 359/495 |
| 6,594,063 B1 | * | 7/2003 | Bergner et al. | 359/251 |

* cited by examiner

Primary Examiner—Akm Enayet Ullah
Assistant Examiner—Jerry T Rahll
(74) Attorney, Agent, or Firm—Lumen Intellectual Property Services, Inc.

(57) ABSTRACT

An optical circulator has a first collimator; a first block of birefringent material; a first compound polarization rotator; a light angle deflector (e.g., Wollaston prism); a second compound polarization rotator; a second block of birefringent material; and a second collimator. Light from the first fiber exits the first collimator along a first path into a first collimated beam that first hits the central plane on a crossing line between the interface and the central plane such that the first collimated beam exits the light angle deflector along a second path substantially parallel to the longitudinal direction and is received by the second fiber. Light from the second fiber exits the second collimator along the second path into a second collimated beam that exits the light angle deflector along a third path and is received by the third fiber.

20 Claims, 11 Drawing Sheets

OPTICAL CIRCULATOR

FIELD OF THE INVENTION

The present invention relates generally to fiber optic devices, and in particular to optical circulators.

BACKGROUND OF THE INVENTION

An optical circulator is an apparatus that has typically three or four ports for accepting optical signals. In a three-port optical circulator, light that enters the circulator through the first port exits through the second port, and light that enters the circulator through the second port exits through the third port. An optical circulator is an inherently non-reciprocal apparatus, since if light enters through the first port it exits through the second port, but if that light is subsequently reflected back from the second port, it does not retrace its path back to the first port, but exits through the third port instead.

Optical circulators are necessary, for example, when using the same fiber for both receiving and transmitting data. The first port may be connected to a data transmitter, and the second port to an end of a long distance optical fiber. Data can be sent from the transmitter to a distant receiver connected to the distant end of the fiber. At the same time, incoming data from a distant transmitter connected to the same fiber enters the circulator through the second port and is directed to the third port where a local receiver may be connected. By installing an optical circulator at each end of a fiber link, a single fiber can support bi-directional communication. An optical circulator can also be used in devices such as wavelength division multiplexers (WDMs), Erbium-doped fiber amplifiers (EDFAs), Raman amplifiers, add-drop multiplexers, dispersion compensators and optical time domain reflectometers (OTDRs).

It should be clear to those skilled in the art that an optical circulator can be readily used as an optical switch with no moving parts if the rotating assembly(s) used can be externally controlled, e.g. by an electrical field or a magnetic field. It is also clear to those skilled in the art that the rotating assembly used in an optical switch can be a Faraday rotator, an electro-optic crystal, a liquid crystal or their equivalents. For example, if a switching electrical field can externally control the rotations of Faraday rotator(s) of a three-port apparatus, the light that enters the second port of the apparatus can be alternatively switched between exiting the first port and exiting the third port.

Optical circulators are now key elements in modern optical networks. However, they have not been widely adopted due to high costs of materials and manufacturing. A typical polarization independent optical circulator usually has many optical elements and a large optical footprint. The manufacturing of a conventional optical circulator requires precise alignment of each separate optical element, which leads to low productivity and high production costs. It is an existing challenge to simplify not only the design of an optical circulator but also the manufacturing procedure.

U.S. Pat. Nos. 5,930,039, 6,052,228, and 6,226,115 disclose recent attempts to improve optical circulator designs. Each of these circulators, however, still suffers from one or more of the following disadvantages: high material cost, large optical footprint, alignment difficulty, and complicated structural configuration. In view of the above, it would be an advance in the art to provide a compact optical circulator (or switch) that has fewer and less expensive optical components, easier manufacturability, less sensitivity to alignment, and improved performance.

SUMMARY

In accordance with the present invention, an improved optical apparatus is provided which has, between first and second compound polarization rotators, a single polarization-dependent light angle deflector (e.g., a Wollaston prism or a Rochon prism) and no additional displacer (e.g., a walk-off crystal). Because the optical apparatus has fewer optical elements, it is simpler in design, easier to align, and less expensive.

In one aspect of the invention, there is provided an optical apparatus, e.g. a circulator, for coupling a light beam from a first fiber to a second fiber and for coupling a light beam from the second fiber to a third fiber. The first and the third fibers are located adjacent to each other at one longitudinal end of the apparatus, while the second fiber is located opposite the first and the third fibers at the other longitudinal end of the apparatus. The first and third fibers are positioned symmetrically with respect to a central plane.

The optical apparatus, e.g. a circulator, has a first collimator for guiding light from the first fiber and for guiding light into the third fiber, a first block of birefringent material adjacent to the first collimator for separating and combining optical components having mutually orthogonal polarizations, and a first compound polarization rotator adjacent to the first block of birefringent material for rendering mutually parallel polarizations orthogonal and mutually orthogonal polarizations parallel. The apparatus also has a second compound polarization rotator for rendering mutually parallel polarizations orthogonal and mutually orthogonal polarizations parallel, a second block of birefringent material adjacent to the second compound polarization rotator for separating and combining mutually orthogonal polarizations, and a second collimator adjacent to the second block of birefringent material for guiding light beams to and from the second fiber. The device also has, positioned between the first and second compound polarization rotators, a single polarization-dependent light angle deflector comprising first and second wedges of birefringent material, the first wedge having a first optic axis, the second wedge having a second optic axis, the first optic axis and the second optic axis being mutually perpendicular, where the first and the second wedges are joined at a common interface.

The apparatus is designed such that a light beam from the first fiber passes through the first collimator and travels along a first path as a first collimated beam. This first collimated beam first intersects the central plane on a crossing line between the interface and the central plane such that the first collimated beam exits the light angle deflector along a second path substantially parallel to the longitudinal direction and is received by the second fiber. The light beam from the second fiber passes through the second collimator and travels along the second path as a second collimated beam. This second collimated beam exits the light angle deflector along a third path and is received by the third fiber.

In another aspect of the invention, the light angle deflector comprises a prism, where each of the first optic axis and the second optic axis is oriented 45 degrees with respect to the central plane and perpendicular to the longitudinal direction. The light angle deflector may be, for example, a Wollaston Prism. Each of the first, the second and the third fibers may be, for example, a thermal expanded core fiber (TECF).

In another aspect of the invention, the first compound polarization rotator has first and second non-reciprocal polarization rotators. The first and second non-reciprocal polarization rotators preferably have opposite rotation directions of 45 degrees. The second compound polarization rotator may comprise third and fourth non-reciprocal polarization rotators which preferably have opposite rotation directions of 45 degrees.

Alternatively, the first compound polarization rotator may comprise a fifth non-reciprocal polarization rotator and a first pair of half wave plates. Similarly, the second compound polarization rotator may comprise a sixth non-reciprocal polarization rotator and a second pair of half wave plates.

In accordance with the present invention, there is further provided an optical apparatus, e.g. an optical circulator, for coupling light beam from a first fiber to a second fiber, light beam from the second fiber to a third fiber and light beam from the third fiber to a fourth fiber. The first and the third fibers are located adjacent to each other along a longitudinal direction and are substantially symmetrical with respect to a central plane. The fourth fiber and the second fiber are located adjacent to each other along the longitudinal direction and opposite the first and the third fibers.

The optical apparatus, e.g. a circulator, has from the first fiber to the second fiber: a first collimator for guiding a light beam from the first fiber, and for guiding a light beam from and to the third fiber; a first block of birefringent material for separating and combining mutually orthogonal polarizations; a first compound polarization rotator for rendering mutually parallel polarizations orthogonal and mutually orthogonal polarizations parallel; a polarization-dependent light angle deflector comprising a first and a second wedges of birefringent material, the first wedge having a first optic axis, the second wedge having a second optic axis, the first optic axis and the second optic axis being mutually perpendicular, the first and the second wedges being joined at an interface; a second compound polarization rotator for rendering mutually parallel polarizations orthogonal and mutually orthogonal polarizations parallel; a second block of birefringent material for separating and combining mutually orthogonal polarizations; and a second collimator for guiding light beam from and to the second fiber, and light beam to the fourth fiber.

The light beam from the first fiber exits the first collimator along a first path into a first collimated beam that first hits the central plane on a crossing line between the interface and the central plane such that the first collimated beam exits the light angle deflector without changing direction, takes a second path and is received by the second fiber. The light beam from the second fiber exits the second collimator along the second path into a second collimated beam that exits the light angle deflector along a third path and is received by the third fiber. The light beam from the third fiber exits the first collimator along the third path into a third collimated beam that exits the light angle deflector without changing direction, takes a fourth path and is received by the fourth fiber.

The light angle deflector has a prism having the first and the second wedges coupled together at their common interface. The first optic axis is oriented 45 degrees with respect to the central plane and perpendicular to the longitudinal direction, and the second optic axis is oriented parallel to the longitudinal direction. The light angle deflector can be a Rochon prism. Each of the first, the second, the third and the fourth fibers can be thermal expanded core fiber (TECF).

The first compound polarization rotator has first and second non-reciprocal polarization rotators. The first and the second non-reciprocal polarization rotators have opposite rotation directions of 45 degrees. The second compound polarization rotator has a third and a fourth non-reciprocal polarization rotators. The third and the fourth non-reciprocal polarization rotators have opposite rotation directions of 45 degrees.

Alternatively, the first compound polarization rotator can have a fifth non-reciprocal polarization rotator and a first pair of half wave plates. The second compound polarization rotator can have a sixth non-reciprocal polarization rotator and a second pair of half wave plates.

The above summary of the present invention is not intended to describe each disclosed embodiment or every implementation of the present invention. The figures and the detailed description will more particularly exemplify these embodiments.

Figure 1A:
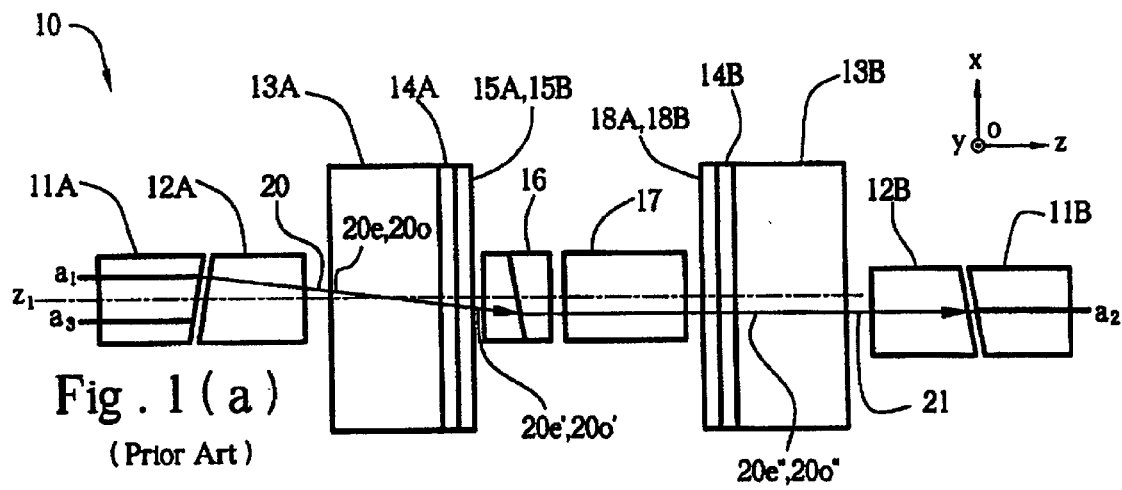
FIG. 1(a) is a schematic side view of the optical path from a first fiber to a second fiber of an optical circulator in the prior art.

While the invention is amenable to various modifications and alternative forms, specifics thereof have been shown by way of examples in the drawings and will be described in detail. It should be understood, however, that the intention is not to limit the present invention to the particular embodiments described. On the contrary, the intention is to cover all modifications, equivalents, and alternatives falling within the spirit and scope of the present invention.

DETAILED DESCRIPTION

Figure 1B:
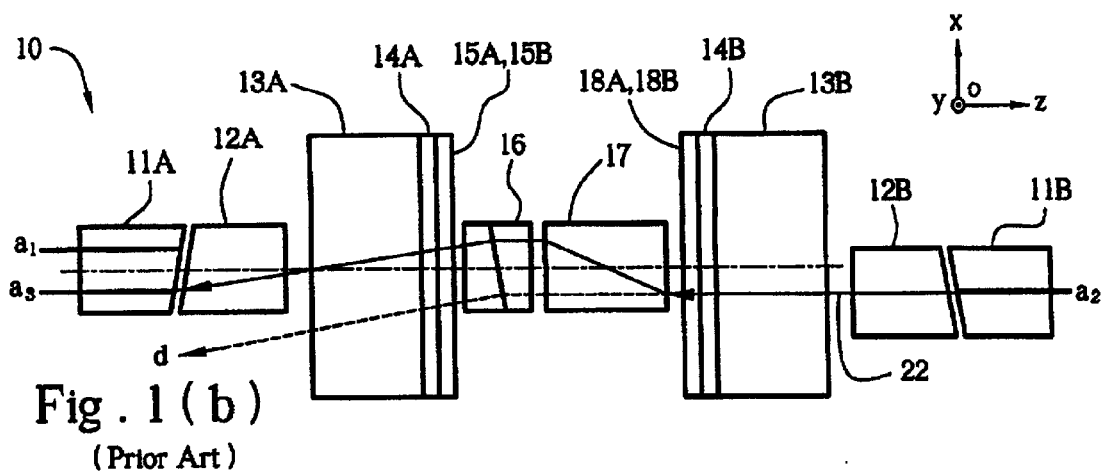
FIG. 1(b) is a schematic side view of the optical path from a second fiber to a third fiber of an optical circulator in the prior art.
Figure 1C:
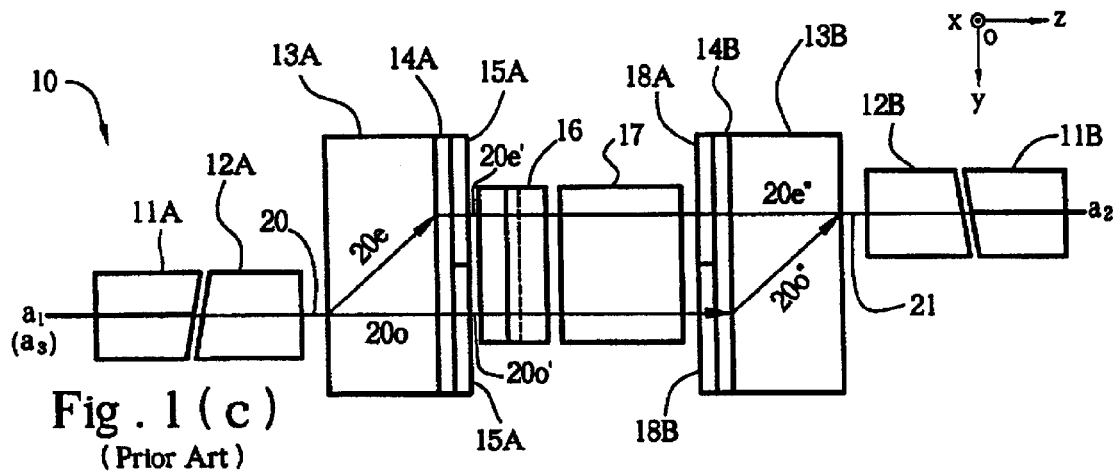
FIG. 1(c) is a schematic top view of the optical path from a first fiber to a second fiber of an optical circulator in the prior art.

FIGS. 1(a)–(c) are schematic side views and top view of optical paths of an optical circulator 10 in the prior art. In FIGS. 1(a)–(c), 11A and 11B are two pigtails holding a first fiber a1, a third fiber a3 and a second fiber a2 respectively. 12A and 12B are first and second collimators. 13A and 13B are first and second birefringent crystals. Elements 14A and 14B are first and second Faraday rotators. Elements 15A/15B and 18A/18B are first and second pairs of half wave plates. Element 16 is a Wollaston prism that serves as a light angle deflector and 17 is a walk-off crystal which is an additional optical element between the polarization rotators. It is significant that this additional optical element complicates the alignment of the device and also increases the component cost and manufacturing expense of the device.

FIG. 1(a) is a schematic side view of the optical path from a first fiber a1 to a second fiber a2 of an optical circulator in the prior art. Since the first fiber a1 is positioned off the axis z1 of the first collimator 12A as shown in FIG. 1(a), the collimated beam 20 from the first fiber a1 is declined forward down. The collimated beam 20 exits the first collimator's end surface at the central area of the first collimator 12A and is separated by the first birefringent crystal 13A into two component rays having mutually orthogonal polarizations, ordinary ray 20o and extraordinary ray 20e as shown in FIG. 1(c). The two component rays 20o, 20e having mutually orthogonal polarizations are changed into two rays 20o', 20e' having parallel polarizations (horizontal in this design) after passing through the first Faraday rotator 14A and the first pair of half wave plates 15A/15B. The half wave plates 15A and 15B have optic axes in different orientations and cover one of the two component rays 20o, 20e respectively. The two rays 20o', 20e' with mutually parallel polarizations receive angle corrections from the Wollaston prism 16 and become parallel to the longitudinal direction Z. After passing through the second pair of half wave plates 18A/18B and the second Faraday rotator 14B, the two rays 20o', 20e' with mutually parallel polarizations (horizontal in this design) are changed into two rays 20o", 20e" having mutually orthogonal polarizations again and are combined by the second birefringent crystal 13B into a collimated beam 21 that is received by the second fiber a2.

FIG. 1(b) is a schematic side view of the optical path from a second fiber a2 to a third fiber a3 of an optical circulator 10 in the prior art. The collimated beam 22 from the second fiber is separated by the second birefringent crystal 13B into two component rays having mutually orthogonal polarizations, ordinary ray 22o and extraordinary ray 22e. The two component rays 22o, 22e having mutually orthogonal polarizations are changed into two rays 22o', 22e' having parallel polarizations (Vertical in this design) after passing through the second pair of half wave plates 18A/18B and the second Faraday rotator 14A. Without walk-off crystal 17, the two rays 22o', 22e' having vertical polarizations will deflect from the Wollaston prism 16, take the optical path d and finally miss the third fiber a3 as shown in FIG. 1(b).

A disadvantage of this prior art design is that walk-off crystal 17 must be included which allows two rays with horizontal polarizations pass through without changing direction while providing a displacement in X direction for two rays with vertical polarizations such that the light beam 22 from the second fiber a2 can finally be received by the third fiber a3. This walk-off crystal 17 is sufficiently long in size that it not only increases the material cost but also increases the optical footprint of the circulator and alignment difficulty in manufacturing.

Figure 2A:
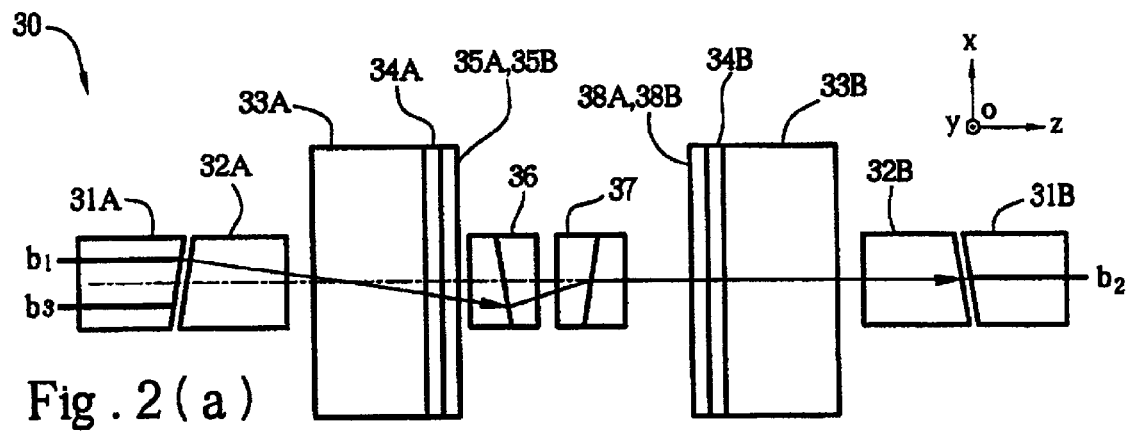
FIG. 2(a) is a schematic side view of the optical path from a first fiber to a second fiber of another optical circulator in the prior art.
Figure 2B:
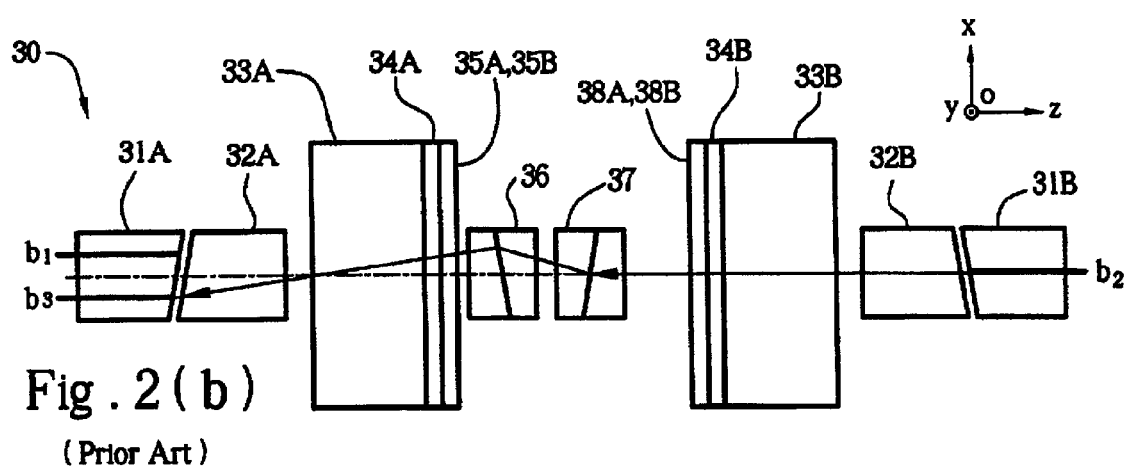
FIG. 2(b) is a schematic side view of the optical path from a second fiber to a third fiber of another optical circulator in the prior art.
Figure 2C:
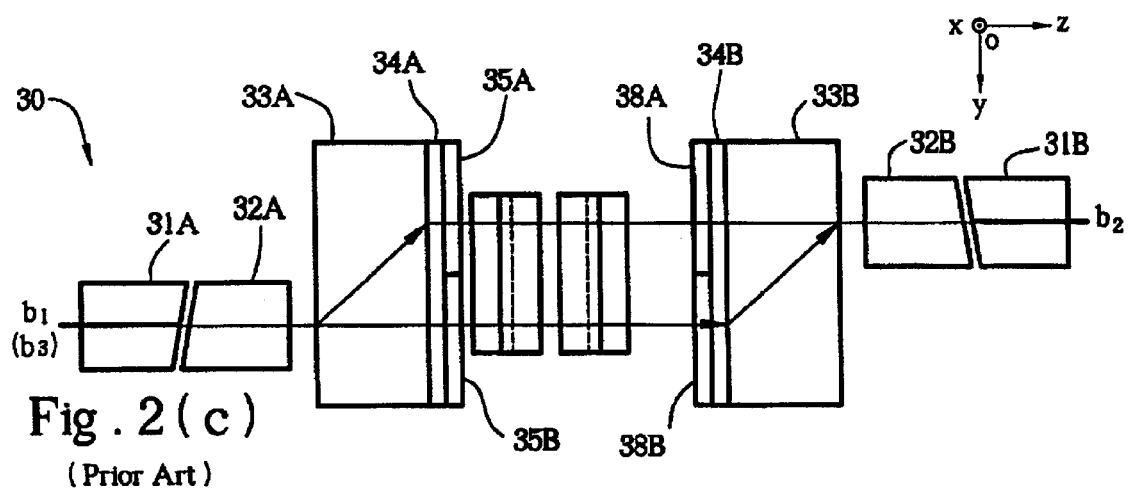
FIG. 2(c) is a schematic top view of the optical path from a first fiber to a second fiber of another optical circulator in the prior art.

FIGS. 2(a)–(c) are schematic side views and top view of optical paths of another optical circulator 30 in the prior art. In FIGS. 2(a)–(c), elements 31A and 31B are two pigtails holding a first fiber b1, a third fiber b3 and a second fiber b2 respectively. Elements 32A and 32B are first and second collimators. Elements 33A and 33B are first and second birefringent crystals. Elements 34A and 34B are first and second Faraday rotators. 35A/35B and 38A/38B are first and second pairs of half wave plates. Element 36 is a first Wollaston prism and 37 is a second Wollaston prism. Instead of using a Wollaston prism 16 and a walk-off crystal 17 between the polarization rotators as shown in FIGS. 1(a)–(c), this system uses two Wollaston prisms 36, 37 to perform substantially the same functions. This approach may slightly lower the optical footprint but still has the some problems of high material cost, larger optical footprint and high alignment difficulty.

Surprisingly, the present invention provides a simpler optical device that provides the same functionality as the more complicated prior art devices. Whereas the prior art devices require two optical elements between polarization rotators, the present invention requires only one. As a result, devices designed according to the principles of the present invention have reduced component costs, smaller optical footprint, are simpler to align, and are less expensive to manufacture than prior art devices.

Figure 3A:
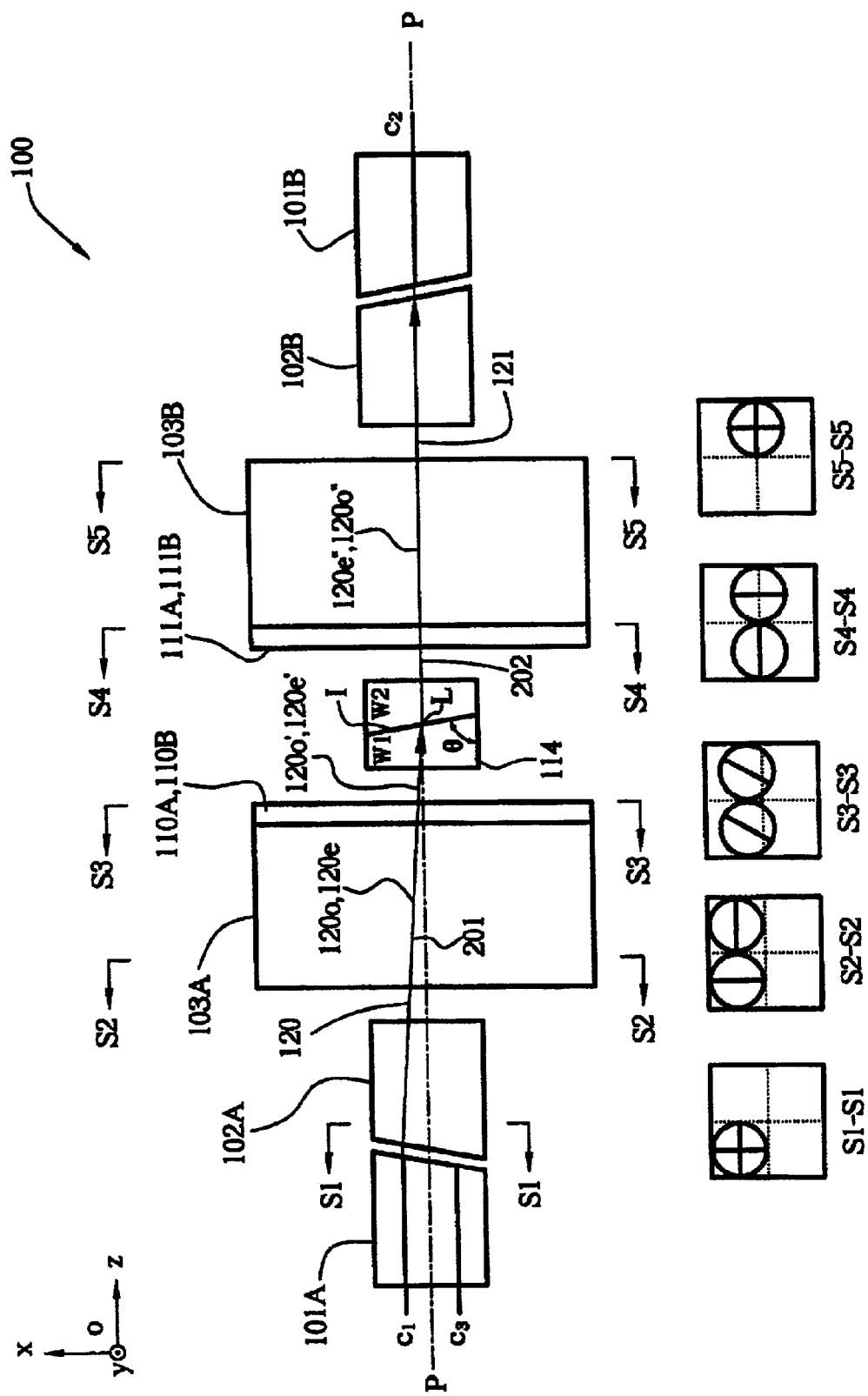
FIG. 3(a) is a schematic side view of the optical path from a first fiber to a second fiber of the optical circulator in accordance with one embodiment of the present invention.
Figure 3B:
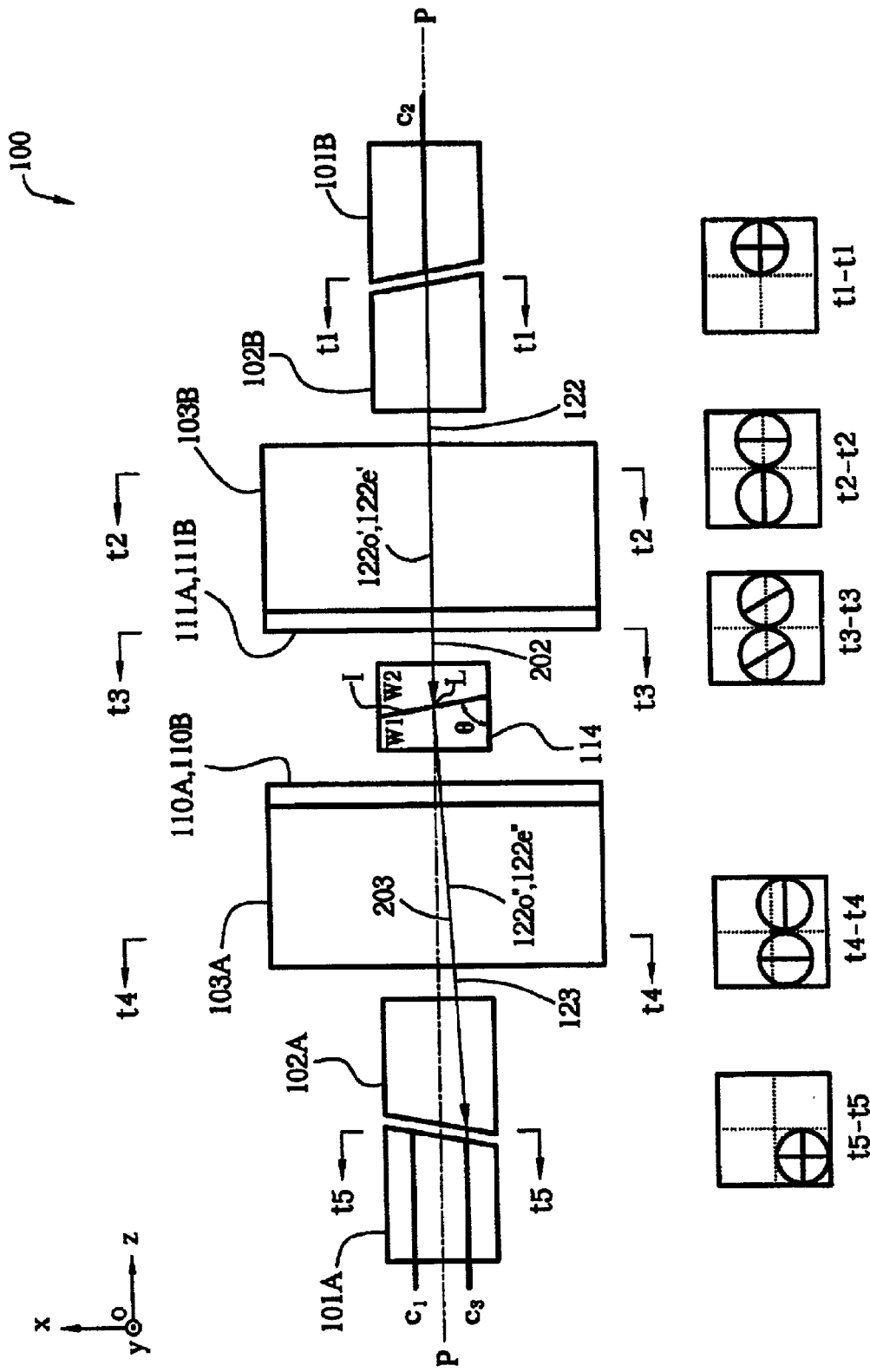
FIG. 3(b) is a schematic side view of the optical path from the second fiber to a third fiber of the optical circulator in accordance with one embodiment of the present invention.
Figure 3C:
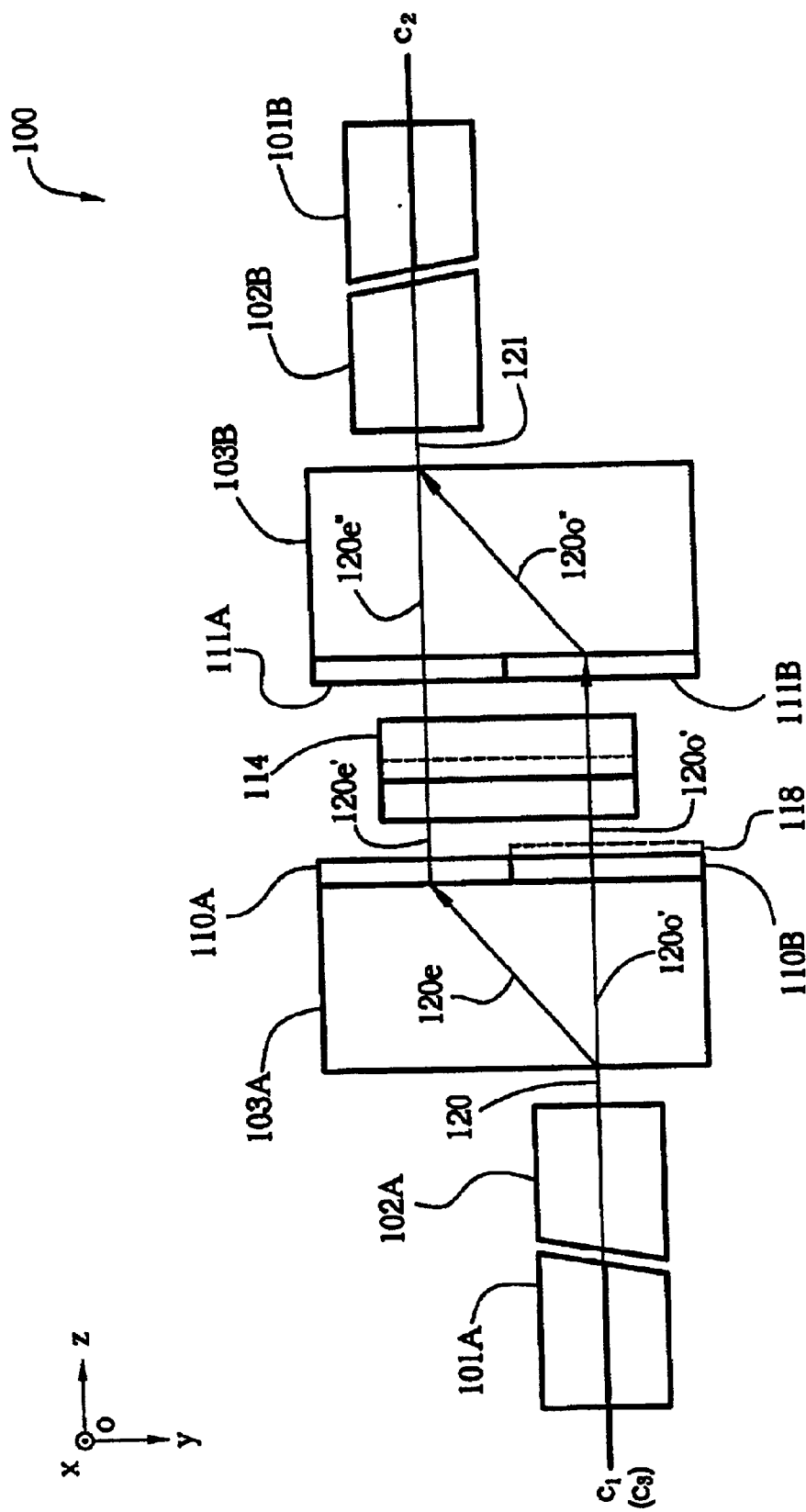
FIG. 3(c) is a schematic top view of the optical path from the first fiber to the second fiber of the optical circulator in accordance with one embodiment of the present invention.

FIGS. 3(a)–(c) are schematic side views and top view of optical paths of the optical circulator 100 of a three-port optical circulator in accordance with one embodiment of the present invention. In FIGS. 3(a)–(c), a first fiber c1 and a third fiber c3 are located adjacent to each other along a longitudinal direction Z and are substantially symmetrical with respect to a central plane P which is parallel to YOZ plane. A second fiber c2 is located opposite the first and the third fibers c1, c3 along the longitudinal direction Z. 101A and 101B are two pigtails holding the first fiber c1, the third fiber c3 and the second fiber c2 respectively.

The circulator 100 has: a first collimator 102A for guiding light beam from the first fiber c1 and to the third fiber c3, a first block of birefringent material 103A for separating and combining mutually orthogonal polarizations; a first compound polarization rotator 110 having a first Faraday rotator 110A and a second Faraday rotator 110B for rendering mutually parallel polarizations orthogonal and mutually orthogonal polarizations parallel; a polarization-dependent light angle deflector, e.g. a Wollaston prism 114, having a first and a second wedges w1, w2 of birefringent material with an interface I between them, the optic axis of the first wedge w1 and the optic axis of the second wedge w2 being mutually perpendicular; a second compound polarization rotator 111 having a third Faraday rotator 111A and a fourth Faraday rotator 111B for rendering mutually parallel polarizations orthogonal and mutually orthogonal polarizations parallel; a second block of birefringent material 103B for separating and combining mutually orthogonal polarizations; and a second collimator 102B for guiding light beam to and from the second fiber c2.

The optic axis of the first wedge w1 and the optic axis of the second wedge w2 of the Wollaston prism 114 are both oriented 45 degrees with respect to the central plane P and perpendicular to the longitudinal direction Z. The first and the second Faraday rotator 110A, 110B provide opposite rotations of 45 degrees. The third and the fourth Faraday rotators 111A, 111B also provide opposite rotations of 45 degree. In accordance with an example of this embodiment, the center of the second fiber c2 is substantially disposed in the central plane P.

FIG. 3(a) is a schematic side view of the optical path from a first fiber c1 to a second fiber c2 of the optical circulator 100 in accordance with this embodiment. The light beam from the first fiber c1 is collimated by the first collimator 102A into a first collimated beam 120 along a first path 201. The first collimator 102A is designed such that, after passing through the first block of birefringent material 103A, the first and the second Faraday rotator 110B, 110A, the first collimated beam 120 will first hit the central plane P on a crossing line L between the interface I of the Wollaston prism 114 and the central plane P as shown in FIG. 3(a).

The first collimated beam 120 is separated by the first block of birefringent material 103A into two rays 120o (ordinary ray) and 120e (extraordinary ray) having mutually orthogonal polarizations as shown in the S2—S2 section view of FIG. 3(a) and in FIG. 3(c). The two rays 120o and 120e having mutually orthogonal polarizations are rotated by the second Faraday rotator 110B and the first Faraday rotator 110A respectively into two rays 120o' and 120e' having mutually parallel polarizations as shown in the S3—S3 section view of FIG. 3(a) and in FIG. 3(c). Both the two rays 120o' and 120e' having mutually parallel polarizations first hit the central plane P on the crossing line L between the interface I of the Wollaston prism 114 and the central plane P as shown in FIG. 3(a). It should be apprehensible to those skilled in the art that the angle θ of the interface I with respect to the central plane P of the Wollaston prism 114 can be decided according to the first path 201 such that the two rays 120o', 120e' having mutually parallel polarizations become parallel to the longitudinal direction Z after exiting the Wollaston prism 114 along a second path 202 along the central plane P.

The two rays 120o' and 120e' having mutually parallel polarizations are rotated by the fourth Faraday rotator 111B and the third Faraday rotator 111A respectively into two rays 120o" and 120e" having mutually orthogonal polarizations as shown in the S4—S4 section view of FIG. 3(a) and in FIG. 3(c). The second block of birefringent material 103B combines two rays 120o" and 120e" having mutually orthogonal polarizations into a first collimated output beam 121 that exits the second collimator 102B and is received by the second fiber c2.

FIG. 3(b) is a schematic side view of the optical path from the second fiber c2 to a third fiber c3 of the optical circulator 100 in accordance with this same embodiment. The light beam from the second fiber c2 is collimated by the second collimator 102B into a second collimated beam 122 along the second path 202 (but in opposite direction of the two rays 120o' and 120e'). After passing through second block of birefringent material 103B, the third and the fourth Faraday rotator 111B, 111A along the second path 202, the second collimated beam 122 hit the central plane P on a crossing line L between the interface I and the central plane P as shown in FIG. 3(b).

The second collimated beam 122 is separated by the second block of birefringent material 103B into two rays 122o (ordinary ray) and 122e (extraordinary ray) having mutually orthogonal polarizations as shown in the t2—t2 section view of FIG. 3(b). The two rays 122o and 122e having mutually orthogonal polarizations are rotated by the third Faraday rotator 111A and the fourth Faraday rotator 111B respectively into two rays 122o' and 122e' having mutually parallel polarizations as shown in the t3—t3 section view of FIG. 3(b). Both the two rays 122o' and 122e' having mutually parallel polarizations hit on the crossing line L between the interface I of the Wollaston prism 114 and the central plane P as shown in FIG. 3(b) along the second path 202 in opposite direction of the longitudinal direction Z. It should be apprehensible to those skilled in the art that as the polarization direction of the two rays 122o' and 122e' having mutually parallel polarizations is perpendicular to that of the two rays 120o' and 120e' having mutually parallel polarizations, the two rays 122o' and 122e' will follow a third path 203 instead of the first path 201 after exiting the Wollaston prism 114.

The two rays 122o' and 122e' having mutually parallel polarizations are rotated by the first Faraday rotator 110A and the second Faraday rotator 110B respectively into two rays 122o" and 122e" having mutually orthogonal polarizations as shown in the t4—t4 section view of FIG. 3(b). The first block of birefringent material 103A combines two rays 122o" and 122e" having mutually orthogonal polarizations into a second collimated output beam 123 that exits the first collimator 102A and is received by the third fiber c3 as shown in FIG. 3(b).

FIG. 3(c) is a schematic top view of the optical path from the first fiber c1 to the second fiber c2 of the optical circulator 100 in accordance with the embodiment shown in FIGS. 3(a) and 3(b).

Figure 4B:
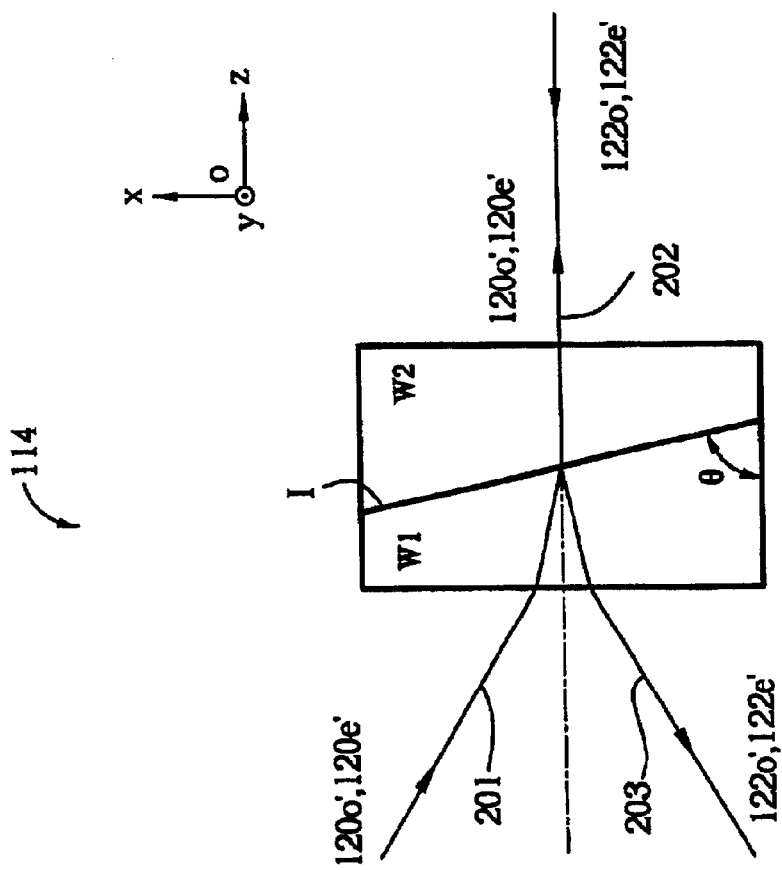
FIG. 4(b) illustrates the optical paths of the Wollaston prism used in the above embodiment of FIGS. 3(a)–(c)
Figure 4A:
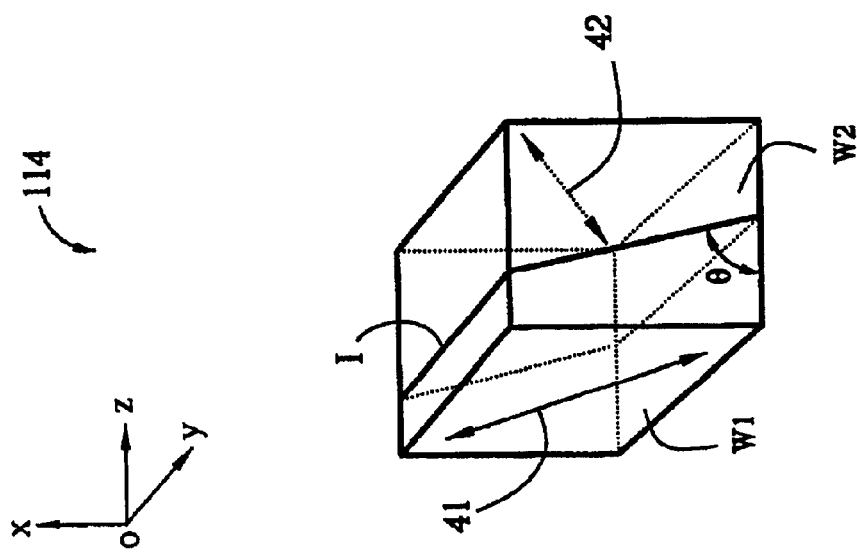
FIG. 4(a) illustrates the structure of the Wollaston prism used in the embodiment of FIGS. 3(a)–(c)

FIG. 4(a) illustrates the structure of the Wollaston prism 114 used in the above embodiment. In FIG. 4(a), each of the first optic axis 41 of the first wedge w1 and the second optic axis 42 of the second wedge w2 are oriented 45 degrees with respect to the central plane P and perpendicular to the longitudinal direction Z. Also, the first optic axis 41 of the first wedge w1 and the second optic axis 42 of the second wedge w2 are perpendicular to each other.

FIG. 4(b) illustrates the optical paths of the Wollaston prism 114 used in the above embodiment. In FIG. 4(b), the two rays 120o' and 120e' from the first fiber first hit the central plane P on the crossing line L between the interface I and the central plane P along the first path 201, exit the Wollaston prism 114 along the second path 202 and are finally received by the second fiber. The two rays 122o' and 122e' from the second fiber hit the central plane P on the crossing line L along the second path 202 (but in opposite direction of the longitudinal direction Z), exit the Wollaston prism 114 along the third path 203 and are finally received by the third fiber. It is also apprehensible to those skilled in the art that the first path 201 and the third path 203 can be substantially symmetrical with respect to the central plane P.

It is apparent to those skilled in the art that the first compound polarization rotator 110 can be replaced by a fifth non-reciprocal polarization rotator, e.g. a Faraday rotator, and a first pair of half wave plates. It is also apparent to those skilled in the art that the second compound polarization rotator 111 can be replaced by a sixth non-reciprocal polarization rotator, e.g. a Faraday rotator, and a second pair of half wave plates. In the case of using a rotator plus a pair of wave plates instead of two rotators, the design of Wollaston is changed. In particular, one optical axis is vertical and another one is horizontal. Those skilled in the art will appreciate that this adaptation of the Wollaston design applies below in all similar cases where the apparatus uses a rotator plus a pair of wave plates.

Each of the first collimator 102A and the second collimator 102B can be a graded index lens or a conventional lens. Each of the first and the second blocks of birefringent material 103A, 103B, and the first and the second wedges w1, w2 can be made of rutile, calcite, yttrium orthovanadate or other birefringent materials. Each two of the first and the second blocks of birefringent material 103A, 103B, and the first and the second wedges w1, w2 are not necessarily made of the same material.

In accordance with one example of the embodiment, thermal expanded core fiber (TECF) can be used as the first fiber c1 and the third fiber c3 to lower the complexity in designing the first collimator 102A. A light beam from a thermal expanded core fiber (TECF) has smaller diverging angle that results in smaller beam width.

It is apparent to those skilled in the art that the optical circulator 100 in this embodiment can be readily used as an 1×2 optical switch with no moving parts if the first compound rotator 110 and the second compound rotator 111 can be externally controlled, e.g. by an electrical field or a magnetic field.

Referring to FIG. 3(b), when coupling light beam from the second fiber c2 to the third fiber c3, the third Faraday rotator 111A and fourth Faraday rotator 111B provide +45° (clockwise), −45° (counterclockwise) rotations to the two rays 122o and 122e (with mutually orthogonal polarizations) respectively and change them into two rays 122o' and 122e' with mutually parallel polarizations as shown in the t3—t3 section view of FIG. 3(b). After passing through the Wollaston prism 114, the two rays 122o' and 122e' are rotated by the first Faraday rotator 110A and second Faraday rotator 110B a +45° (clockwise) rotation and a −45° (counterclockwise) rotation respectively into the two rays 122o" and 122e" with mutually orthogonal polarizations as shown in the t4—t4 section view of FIG. 3(b).

It is apparent to those skilled in the art that both the first compound rotator 110 (having the first Faraday rotator 110A and the second Faraday 110B) and the second compound rotator 111 (having the third Faraday rotator 111A and the fourth Faraday 111B) can be externally controlled to provide a two-state device, where:

State 1: +45° (clockwise), −45° (counterclockwise) rotations to the two rays 122o and 122e (with mutually orthogonal polarizations) respectively, and +45° (clockwise), −45° (counterclockwise) rotations to the two rays 122o' and 122e' (with mutually parallel polarizations) respectively; or State 2: −45° (counterclockwise), +45° (clockwise) rotations to the two rays 122o and 122e (with mutually orthogonal polarizations) respectively, and −45° (counterclockwise), +45° (clockwise) rotations to the two rays 122o' and 122e' (with mutually parallel polarizations) respectively.

By alternating the state of the device through such external control, the light beam from the second fiber c2 can be alternatively coupled to the first fiber c1 and the third fiber c3.

It is also apprehensible to those skilled in the art that the Faraday rotators used in such an optical switch can also be an electro-optic crystal, a liquid crystal or their equivalents.

FIGS. 5(a)–(d) are schematic side views and top view of optical paths of a four-port optical circulator 300 in accordance with another embodiment of the present invention. In FIGS. 5(a)–(d), a first fiber g1 and a third fiber g3 are located adjacent to each other along a longitudinal direction Z and are substantially symmetrical with respect to a central plane P1 which is parallel to YOZ plane. A fourth fiber g4 and a second fiber g2 are located opposite the first and the third fibers g1, g3 along the longitudinal direction Z. 301A and 301B are two pigtails holding the first and the third fiber g1, g3, and the fourth and the second fiber g4, g2 respectively.

The circulator 300 has: a first collimator 302A for guiding a light beam from the first fiber g1, and for guiding a light beam from and to the third fiber g3; a first block of birefringent is material 303A for separating and combining mutually orthogonal polarizations; a first compound polarization rotator 310 having a first Faraday rotator 310A and a second Faraday rotator 310B for rendering mutually parallel polarizations orthogonal and mutually orthogonal polarizations parallel; a polarization-dependent light angle deflector, e.g. a Rochon prism 315, having a first and a second wedges h1, h2 of birefringent material with an interface I1 between them, the optic axis of the first wedge h1 and the optic axis of the second wedge h2 are mutually perpendicular; a second compound polarization rotator 311 having a third Faraday rotator 311A and a fourth Faraday rotator 311B for rendering mutually parallel polarizations orthogonal and mutually orthogonal polarizations parallel; a second block of birefringent material 303B for separating and combining mutually orthogonal polarizations; and a second collimator 302B for guiding light beam to and from the second fiber g2, and light beam to the fourth fiber g4.

The optic axis of the first wedge h1 of the Rochon prism 315 is oriented 45 degrees with respect to the central plane P1 and the optic axis of the second wedge h2 is oriented parallel to the longitudinal direction Z. The first and the second Faraday rotators 310A, 310B provide opposite rotations of 45 degrees. The third and the fourth Faraday rotators 311A, 311B also provide opposite rotations of 45 degrees. In accordance with an example of this embodiment, the second fiber g2 and the fourth fiber g4 are also substantially symmetrical with respect to the central plane P1.

Figure 5A:
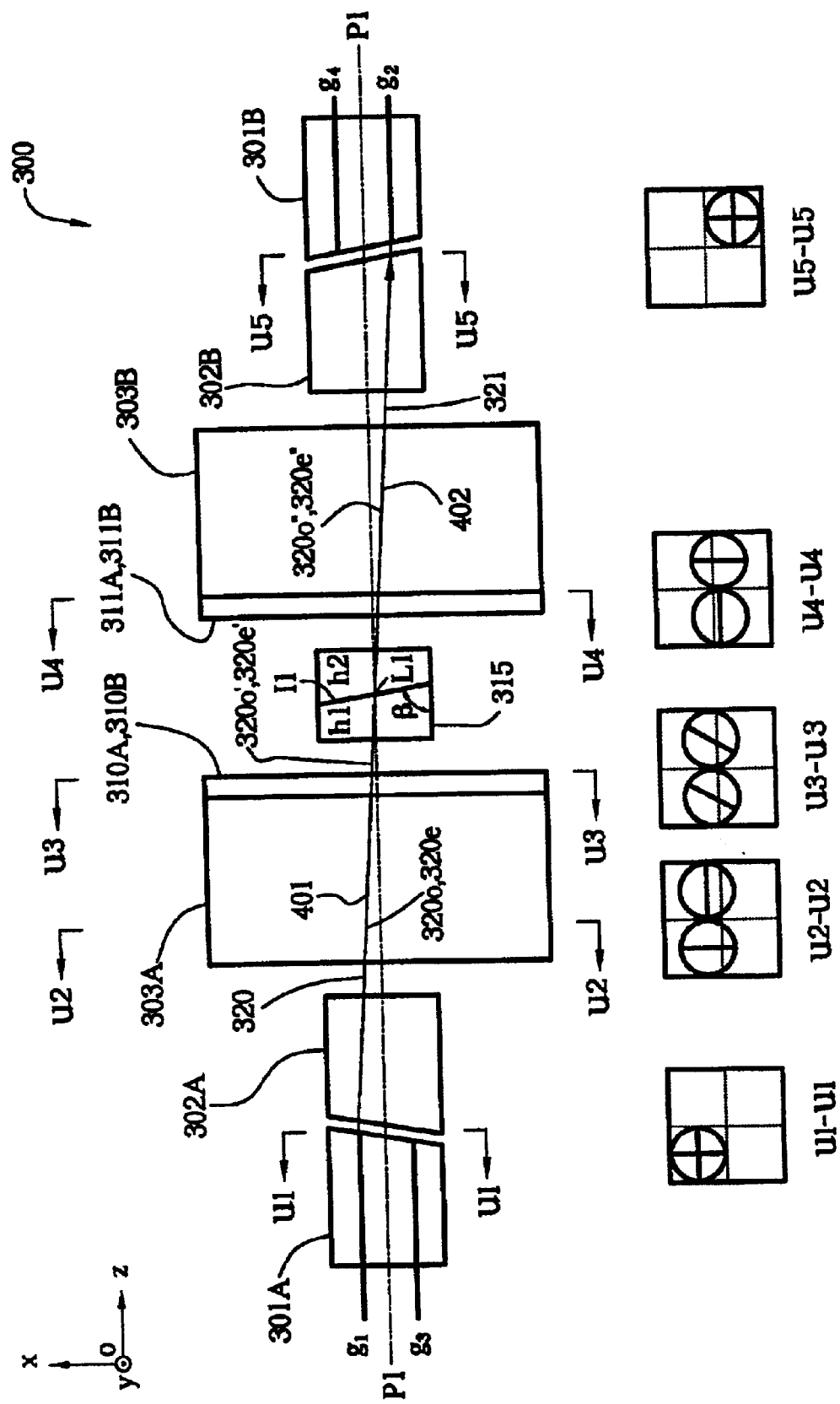
FIG. 5(a) is a schematic side view of the optical path from a first fiber to a second fiber of the optical circulator in accordance with another embodiment of the present invention.

FIG. 5(a) is a schematic side view of the optical path from the first fiber g1 to the second fiber g2 of the optical circulator 300 in accordance with this embodiment. The light beam from the first fiber g1 is collimated by the first collimator 302A into a first collimated beam 320 along a first path 401. The first collimator 302A is designed such that, after passing through first block of birefringent material 303A, the first and the second Faraday rotator 310B, 310A, the first collimated beam 320 will first hit the central plane P1 on a crossing line L1 between the interface I1 of the Rochon prism 315 and the central plane P1 as shown in FIG. 5(a).

Figure 5B:
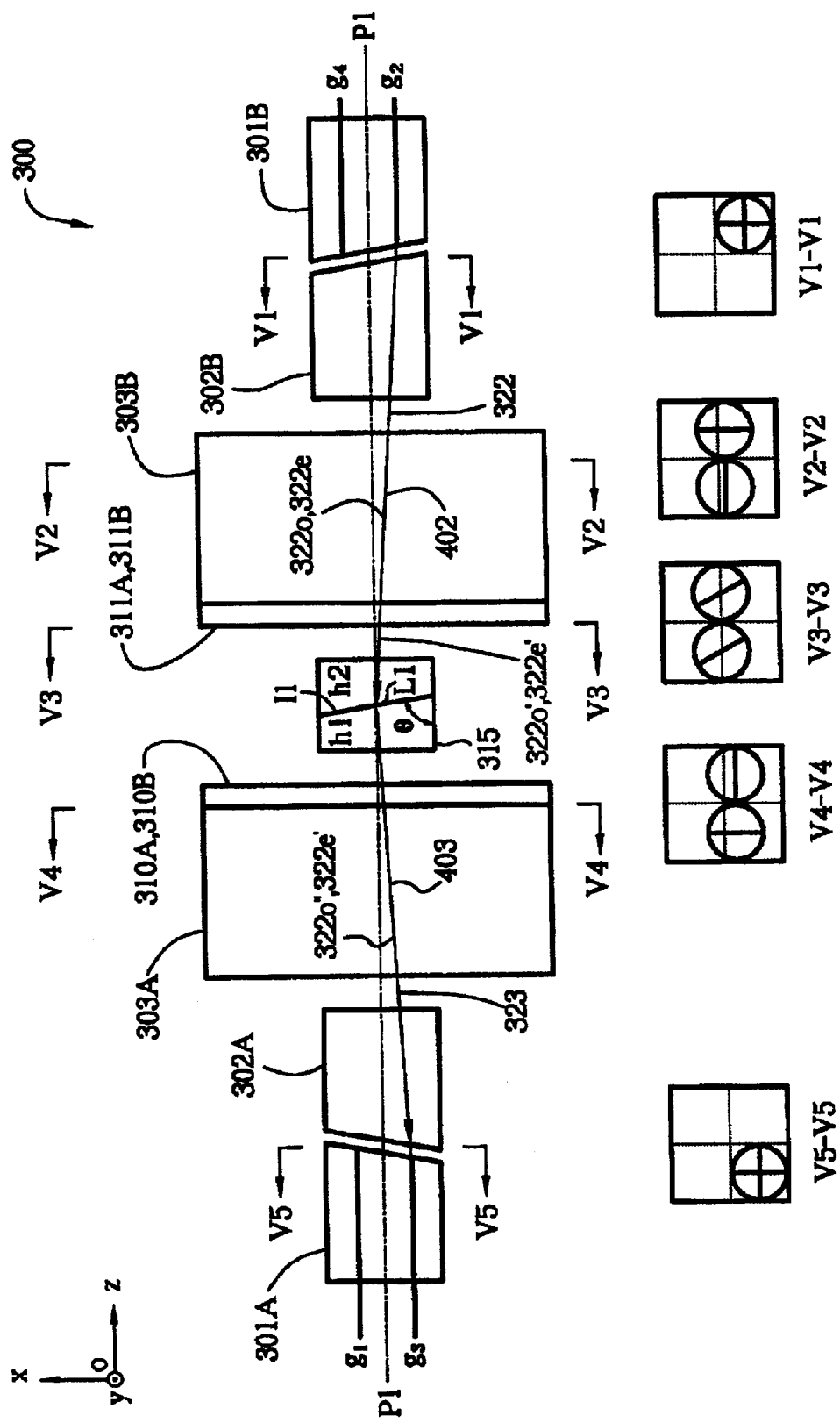
FIG. 5(b) is a schematic side view of the optical path from the second fiber to a third fiber of the optical circulator in accordance with another embodiment of the present invention.
Figure 5C:
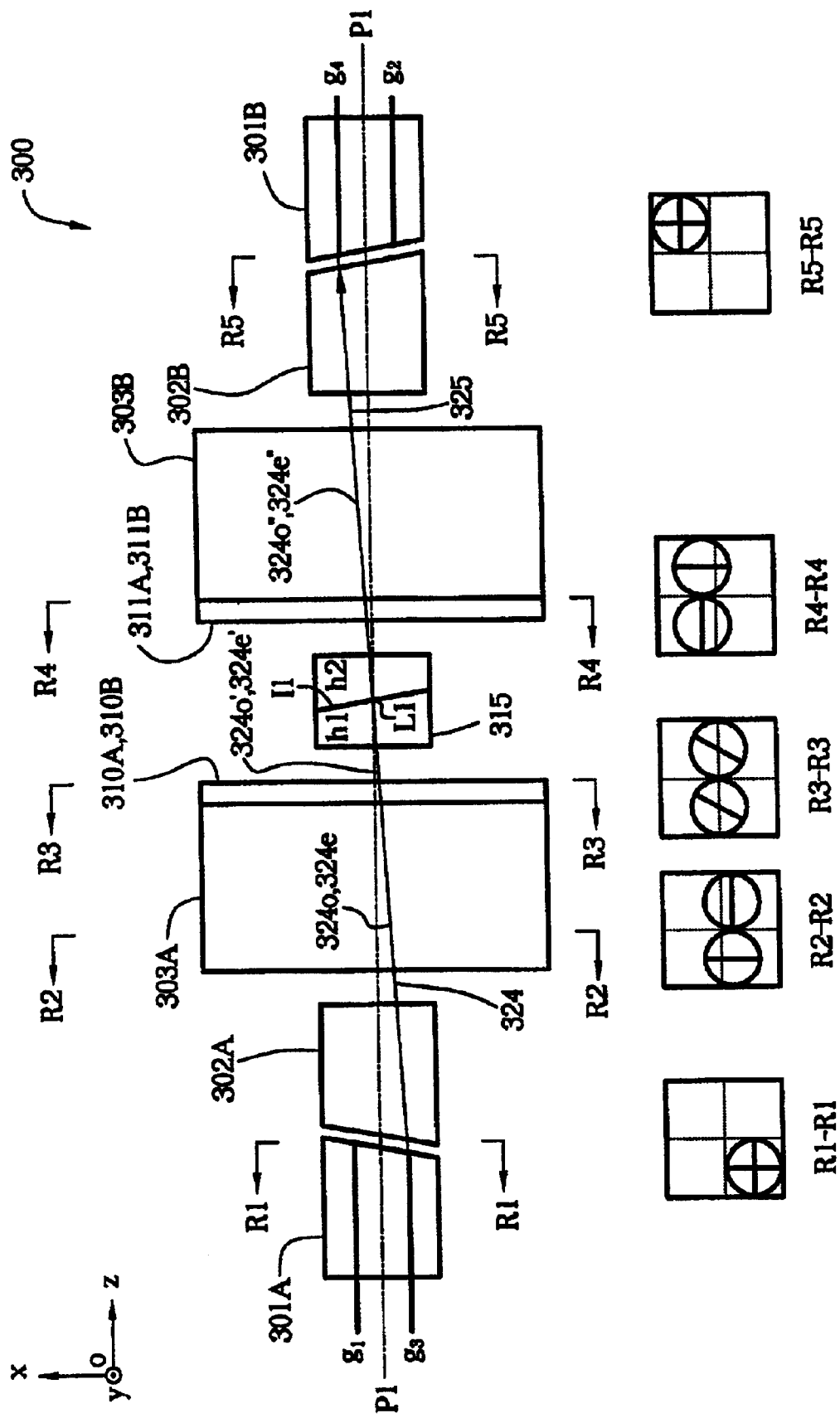
FIG. 5(c) is a schematic side view of the optical path from the third fiber to a fourth fiber of the optical circulator in accordance with another embodiment of the present invention.
Figure 5D:
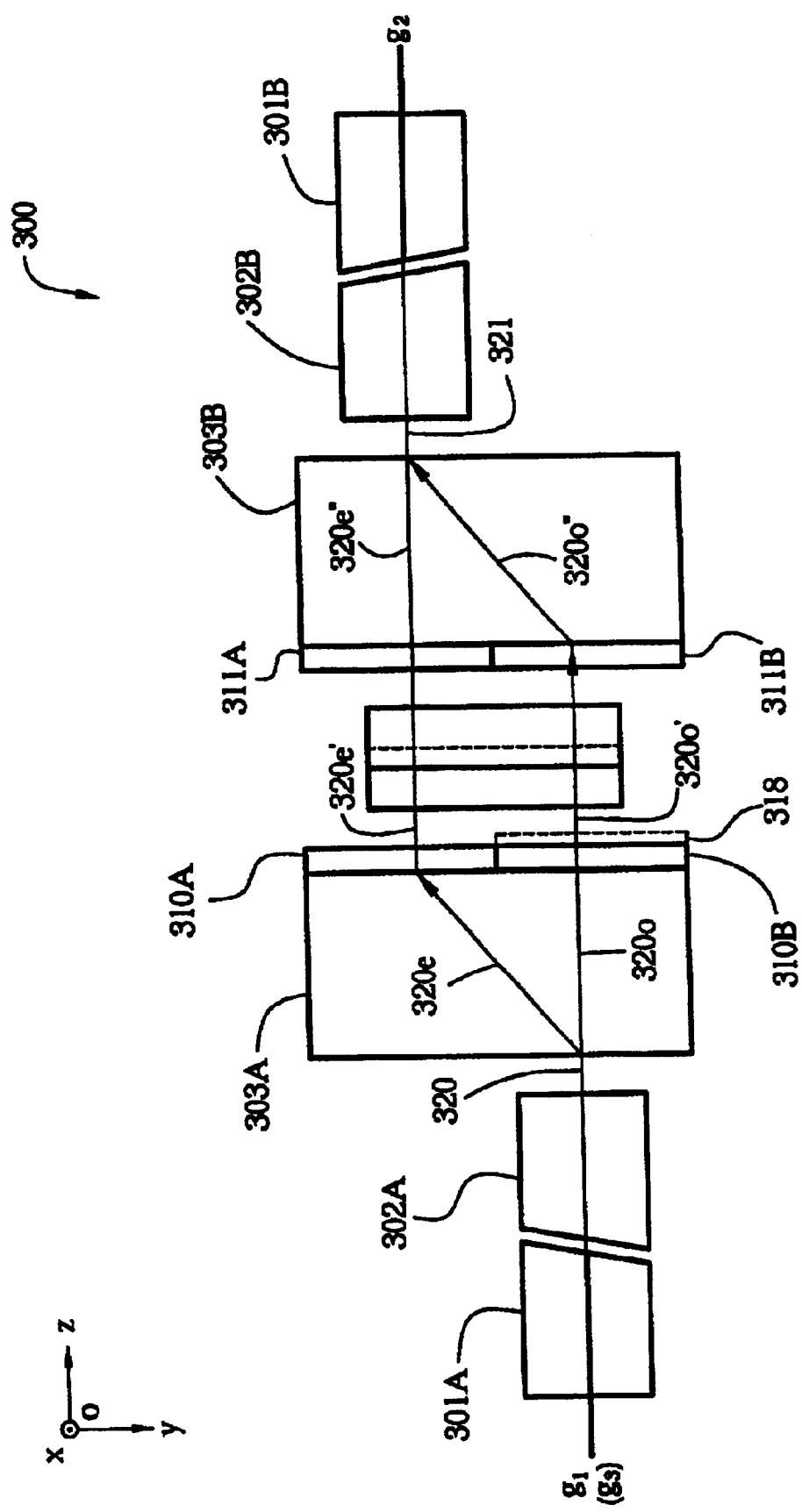
FIG. 5(d) is a schematic top view of the optical path of the optical circulator in accordance with another embodiment of the present invention.

The first collimated beam 320 is separated by the first block of birefringent material 303A into two rays 320o (ordinary ray) and 320e (extraordinary ray) having mutually orthogonal polarizations as shown in the u2—u2 section view of FIG. 5(a) and in FIG. 5(d). The two rays 320o and 320e having mutually orthogonal polarizations are rotated by the second Faraday rotator 310B and the first Faraday rotator 310A respectively into two rays 320o' and 320e' having mutually parallel polarizations as shown in the u3—u3 section view of FIG. 5(a) and in FIG. 5(d). Both the two rays 320o' and 320e' having mutually parallel polarizations first hit the central plane P1 on the crossing line L1 between the interface I1 of the Rochon prism 315 and the central plane P1 as shown in FIG. 5(a). It should be apprehensible to those skilled in the art that the orientations of the optical axes of the two wedges result in no change in direction for these two rays.

These two rays 320o' and 320e' having mutually parallel polarizations are rotated by the fourth Faraday rotator 311B and the third Faraday rotator 311A respectively into two rays 320o" and 320e" having mutually orthogonal polarizations as shown in the u4—u4 section view of FIG. 5(a) and in FIG. 5(d). The second block of birefringent material 303B combines two rays 320o" and 320e" having mutually orthogonal polarizations into a first collimated output beam 321 that exits the second collimator 302B and is received by the second fiber g2.

FIG. 5(b) is a schematic side view of the optical path from the second fiber to a third fiber of the optical circulator 300 in accordance with this same embodiment. The light beam from the second fiber g2 is collimated by the second collimator 302B into a second collimated beam 322 along the second path 402 (but in the opposite direction of the longitudinal direction Z). The second collimator 302B is designed such that, after passing through second block of birefringent material 303B, the third and the fourth Faraday rotator 311B, 311A along the second path 402, the second collimated beam 322 first hit the central plane P1 on a crossing line L1 between the interface I1 and the central plane P1 as shown in FIG. 5(b).

The second collimated beam 322 is separated by the second block of birefringent material 303B into two rays 322o (ordinary ray) and 322e (extraordinary) having mutually orthogonal polarizations as shown in the v2—v2 section view of FIG. 5(b). The two rays 322o and 322e having mutually orthogonal polarizations are rotated by the third Faraday rotator 311A and the fourth Faraday rotator 311B respectively into two rays 322o ' and 322e ' having mutually parallel polarizations as shown in the v3—v3 section view of FIG. 5(b). Both the two rays 322o' and 322e' having mutually parallel polarizations first hit the central plane P1 on the crossing line L1 between the interface I1 of the Rochon prism 315 and the central plane P1 as shown in FIG. 5(b) along the second path 402. It should be apprehensible to those skilled in the art that because the polarization direction of the two rays 322o' and 322e' is perpendicular to that of the two rays 320o' and 320e', the two rays 322o' and 322e' will follow a third path 403 instead of the first path 401 after exiting the Rochon prism 315. In this case, the deflection angle of the two rays as they pass through the light angle deflector 315 depends on the wedge angle β and on the indices of wedge materials.

The two rays 322o' and 322e' having mutually parallel polarizations are rotated by the first Faraday rotator 310A and the second Faraday rotator 310B respectively into two rays 322o" and 322e" having mutually orthogonal polarizations as shown in the v4—v4 section view of FIG. 5(b). The first block of birefringent material 303A combines the two rays 322o" and 322e" having mutually orthogonal polarizations into a second collimated output beam 323 that exits the first collimator 302A and is received by the third fiber g3 as shown in FIG. 5(b).

FIG. 5(c) is a schematic side view of the optical path from the third fiber g3 to the fourth fiber g4 of the optical circulator 300 in accordance with the embodiment. The light beam from the third fiber g3 is collimated by the first collimator 302A into a third collimated beam 324 along the third path 403. The first collimator 302A is designed such that, after passing through first block of birefringent material 303A, the first and the second Faraday rotator 310B, 310A, the third collimated beam 324 will also first hit the central plane P1 on the crossing line L1 between the interface I1 of the Rochon prism 315 and the central plane P1 as shown in FIG. 5(c).

The third collimated beam 324 is separated by the first block of birefringent material 303A into two rays 324o (ordinary ray) and 324e (extraordinary ray) having mutually orthogonal polarizations as shown in the r2—r2 section view of FIG. 5(c). The two rays 324o and 324e having mutually orthogonal polarizations are rotated by the second Faraday rotator 310B and the first Faraday rotator 310A respectively into two rays 324o' and 324e' having mutually parallel polarizations as shown in the r3—r3 section view of FIG. 5(c). Both the two rays 324o' and 324e' having mutually parallel polarizations first hit the central plane P1 on the crossing line L1 between the interface I1 of the Rochon prism 315 and the central plane P1 as shown in FIG. 5(c). The polarization direction of the two rays 324o' and 324e' having mutually parallel polarizations is parallel to that of the two rays 320o' and 320e' (see also FIG. 5(a)) having mutually parallel polarizations. It should be apprehensible to those skilled in the art that the two rays 324o', 324e' having mutually parallel polarizations along the first path 401 also do not change directions after exiting the Rochon prism 315 along a fourth path 404.

The two rays 324o' and 324e' having mutually parallel polarizations are rotated by the fourth Faraday rotator 311B and the third Faraday rotator 311A respectively into two rays 324o" and 324e" having mutually orthogonal polarizations as shown in the r4—r4 section view of FIG. 5(c). The second block of birefringent material 303B combines two rays 324o" and 324e" having mutually orthogonal polarizations into a third collimated output beam 325 that exits the second collimator 302B and is received by the fourth fiber g4.

FIG. 5(d) is a schematic top view of the optical path from the first fiber g1 to the second fiber g2 of the optical circulator 300 in accordance with the embodiment of FIGS. 5(a)–(c).

Figure 6B:
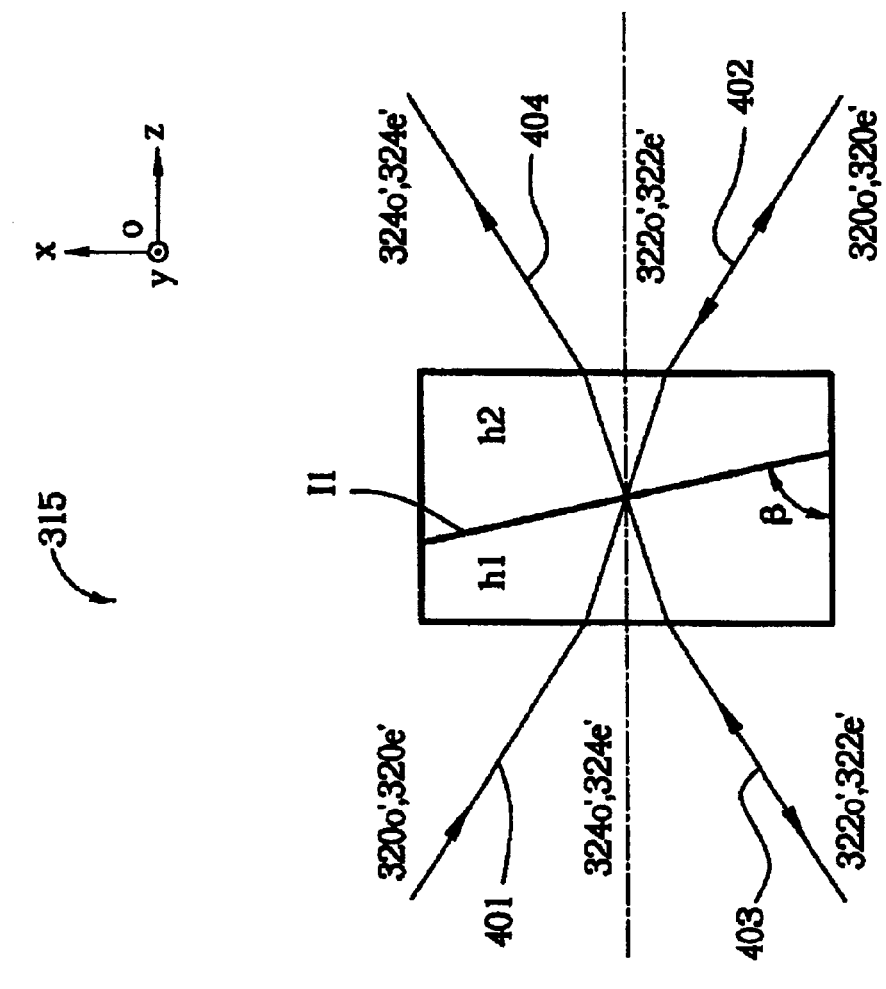
FIG. 6(b) illustrates the optical paths of the Rochon prism used in the above embodiment of FIGS. 5(a)–(d).
Figure 6A:
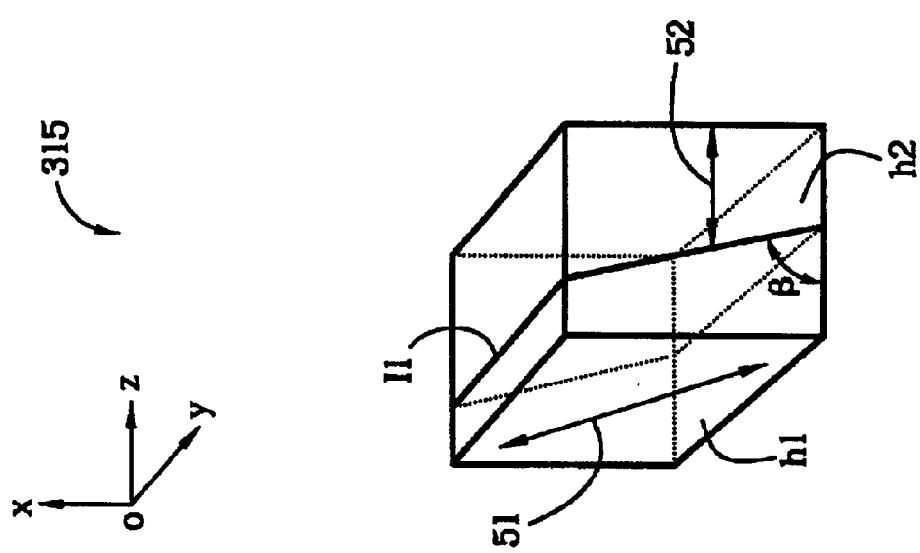
FIG. 6(a) illustrates the structure of the Rochon prism used in the embodiment of FIGS. 5(a)–(d)

FIG. 6(a) illustrates the structure of the Rochon prism 315 used in the embodiment of FIGS. 5(a)–(d). In FIG. 6(a), the optic axis 51 of the first wedge h1 of the Rochon prism 315 is oriented 45 degrees with respect to the central plane P1 and the optic axis 52 of the second wedge h2 is oriented parallel to the longitudinal direction Z. The optic axis 51 of the first wedge h1 is perpendicular to the optic axis 52 of the second wedge h2.

FIG. 6(b) illustrates the optical paths of the Rochon prism 315 used in the above embodiment of FIGS. 5(a)–(d). In FIG. 6(b), the two rays 320o' and 320e' from the first fiber first hit the central plane P1 on the crossing line L1 between the interface I1 and the central plane P1 along the first path 401, exit the Rochon prism 315 without changing directions along the second path 402 and is finally received by the second fiber. The two rays 322o' and 322e' from the second fiber first hit the central plane P1 on the crossing line L1 between the interface I1 and the central plane P1 along the second path 402 (but in opposite direction), exit the Rochon prism 315 along the third path 403 and is finally received by the third fiber. The two rays 324o' and 324e' from the third fiber first hit the central plane P1 on the crossing line L1 between the interface I1 and the central plane P1 along the third path 403, exit the Rochon prism 315 without changing directions along the fourth path 404 and is finally received by the fourth fiber.

It is apprehensible to those skilled in the art that the first path 401 and the third path 403 in this embodiment are substantially symmetrical with respect to the central plane P1, and so are the second path 402 and the fourth path 404. It is also apprehensible to those skilled in the art that the angle β of interface I1 of the Rochon prism 315 with respect to the central plane P1 can be readily decided to meet the requirements of the first, second, third and fourth paths 401, 402, 403 and 404 of the circulator 300.

It is apparent to those skilled in the art that the first compound polarization rotator 310 can be replaced by a fifth non-reciprocal polarization rotator, e.g. a Faraday rotator, and a first pair of half wave plates. It is also apparent to those skilled in the art that the second compound polarization rotator 311 can be replaced by a sixth non-reciprocal polarization rotator, e.g. a Faraday rotator, and a second pair of half wave plates.

Each of the first collimator 302A and the second collimator 302B can be a graded index lens or a conventional lens. Each of the first and the second blocks of birefringent material 303A, 303B, and the first and the second wedges h1, h2 can be made of rutile, calcite, yttrium orthovanadate or other birefringent materials. Each two of the first and the second blocks of birefringent material 303A, 303B, and the first and the second wedges h1, h2 are not necessarily made of the same material.

In accordance with one example of the embodiment, thermal expanded core fiber (TECF) can be used as the first fiber g1, the second fiber g2, the third fiber g3 and the fourth fiber g4 to lower the complexity in designing the first collimator 302A and the second collimator 302B. A light beam from a thermal expanded core fiber (TECF) has smaller diverging angle that results in smaller beam width.

Similar to the discussion of the first embodiment (three-port), it is also apparent to those skilled in the art that the optical circulator 300 in this embodiment can be readily used as an optical router if the first compound rotator 310 (having first Faraday rotator 310A and second Faraday rotator 310B) and the second compound rotator 311 (having third Faraday rotator 311A and fourth Faraday rotator 311B) can be externally controlled, e.g. by an electrical field or a magnetic field.

By externally controlling the first compound rotator 310 (having first Faraday rotator 310A and second Faraday rotator 310B) and the second compound rotator 311 (having third Faraday rotator 311A and fourth Faraday rotator 311B) to alternatively provide rotations between a first state (+45°, −45°) and a second state (−45°, +45°), a light beam from the second fiber g2 can be selectively coupled to the third fiber g3 or to the first fiber g1, and a light beam from the third fiber g3 can be selectively coupled to the second fiber g2 or to the fourth fiber g4.

It is also apprehensible to those skilled in the art that the Faraday rotators used in such an optical switch can also be an electro-optic crystal, a liquid crystal or their equivalents.

In above two embodiments, the ordinary ray and the extraordinary ray have different optical routes when they pass through the first block of birefringent material or the second block of birefringent material due to the difference between the refractive index for the ordinary ray and the refractive index for the extraordinary ray. This may result in different crossing points when the ordinary ray and the extraordinary ray hit on the central plane P or P1 and then further causes polarization dependent loss (PDL) and polarization mode dispersion (PMD). The inventors' calculations indicate that the potential PDL and PMD are limited to acceptable levels. Nevertheless, a compensator (118 in FIG. 3(c), 318 in FIG. 5(d)) can be used, if desired, to compensate for the optical path difference.

The optical apparatus in the attached claims should not be considered limited to the above embodiments of optical circulators, but rather should be understood to cover both optical circulators and optical switches with substantially the same structures. It is understandable to those of skill in the art that an optical circulator can inherently provide optical-switching functions without substantially changing its structure if externally controlling of the status of the rotating element(s) used can be provided.

The present invention should not be considered limited to the particular examples described above, but rather should be understood to cover all aspects of the present invention as fairly set out in the attached claims. Various modifications, equivalents, as well as numerous geometrical configurations to which the present invention may be applicable will be readily apparent to those skilled in the art to which the present invention is directed upon review of the present specification.

What is claimed is:

1. An optical apparatus for coupling a first light beam from a first fiber to a second fiber and for coupling a second light beam from said second fiber to a third fiber, said second fiber being located opposite said first and said third fibers along a longitudinal direction of the apparatus, said first and said third fibers being located adjacent to each other along said longitudinal direction and being substantially symmetrical with respect to a central plane, said optical apparatus comprising along said longitudinal direction in sequence from said first and third fibers to said second fiber:

(a) a first collimator in optical communication with said first and third fibers;

(b) a first block of birefringent material;

(c) a first compound polarization rotator;

(d) a polarization-dependent light angle deflector consisting of first and second wedges of birefringent material, said first and second wedges having mutually perpendicular first and second optic axes respectively, said first and second wedges joined at an interface;

(e) a second compound polarization rotator;

(f) a second block of birefringent material; and (g) a second collimator in optical communication with said second fiber;

wherein no collimator or lens is disposed between said first and second collimators; and wherein no polarization-dependent optical element other than said light angle deflector is disposed between said first and second compound polarization rotators.

2. The optical apparatus of claim 1, wherein each of said first and second optic axes is oriented 45 degrees with respect to said central plane and is oriented perpendicular to said longitudinal direction.

3. The optical apparatus of claim 1, wherein said light angle deflector is a Wollaston Prism.

4. The optical apparatus of claim 1, wherein said first compound polarization rotator comprises a first and a second non-reciprocal polarization rotators.

5. The optical apparatus of claim 4, wherein said first and said second non-reciprocal polarization rotators have opposite rotation directions of 45 degrees.

6. The optical apparatus of claim 1, wherein said second compound polarization rotator comprises a third and a fourth non-reciprocal polarization rotators.

7. The optical apparatus of claim 6, wherein said third and said fourth non-reciprocal polarization rotators have opposite rotation directions of 45 degrees.

8. The optical apparatus of claim 1, wherein said first compound polarization rotator comprises a fifth non-reciprocal polarization rotator and a first pair of half wave plates.

9. The optical apparatus of claim 1, wherein said second compound polarization rotator comprises a sixth non-reciprocal polarization rotator and a second pair of half wave plates.

10. The optical apparatus of claim 1, further comprising a compensator to compensate for optical path differences.

11. An optical apparatus for coupling a first light beam from a first fiber to a second fiber, a second light beam from said second fiber to a third fiber and a third light beam from said third fiber to a fourth fiber, said first and third fibers being located adjacent to each other along a longitudinal direction and being substantially symmetrical with respect to a central plane, said fourth and second fibers being located adjacent to each other along said longitudinal direction and opposite said first and third fibers, said optical apparatus comprising along said longitudinal direction in sequence from said first and third fibers to said second and fourth fibers:

(a) a first collimator in optical communication with said first and third fibers;

(b) a first block of birefringent material;

(c) a first compound polarization rotator;

(d) a polarization-dependent light angle deflector consisting of first and second wedges of birefringent material, said first and second wedges having mutually perpendicular first and second optic axes respectively, said first and said second wedges having an interface;

(e) a second compound polarization rotator;

(f) a second block of birefringent material; and (g) a second collimator in optical communication with said second and fourth fibers;

wherein no collimator or lens is disposed between said first and second collimators; and wherein no polarization-dependent optical element other than said light angle deflector is disposed between said first and second compound polarization rotators.

12. The optical apparatus of claim 11, wherein said first optic axis is oriented 45 degrees with respect to said central plane, and wherein said second optic axis is oriented parallel to said longitudinal direction.

13. The optical apparatus of claim 11, wherein said light angle deflector is a Rochon prism.

14. The optical apparatus of claim 11, wherein said first compound polarization rotator comprises a first and a second non-reciprocal polarization rotators.

15. The optical apparatus of claim 14, wherein said first and said second non-reciprocal polarization rotators have opposite rotation directions of 45 degrees.

16. The optical apparatus of claim 11, wherein said second compound polarization rotator comprises a third and a fourth non-reciprocal polarization rotators.

17. The optical apparatus of claim 16, wherein said third and said fourth non-reciprocal polarization rotators have opposite rotation directions of 45 degrees.

18. The optical apparatus of claim 11, wherein said first compound polarization rotator comprises a fifth non-reciprocal polarization rotator and a first pair of half wave plates.

19. The optical apparatus of claim 11, wherein said second compound polarization rotator comprises a sixth non-reciprocal polarization rotator and a second pair of half wave plates.

20. The optical apparatus of claim 11, further comprising a compensator to compensate optical path difference.

* * * * *